(12) United States Patent
Takeuchi

(10) Patent No.: US 7,570,237 B2
(45) Date of Patent: Aug. 4, 2009

(54) METHOD AND APPARATUS FOR ADJUSTING QUALITY OF A DISPLAYED IMAGE

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1502 days.

(21) Appl. No.: 09/776,677

(22) Filed: Feb. 6, 2001

(65) Prior Publication Data

US 2001/0017619 A1    Aug. 30, 2001

Related U.S. Application Data

(63) Continuation of application No. PCT/JP00/03629, filed on Jun. 2, 2000.

(30) Foreign Application Priority Data

Jun. 7, 1999    (JP)    ............... 11-159021

(51) Int. Cl.
*G09G 3/36*    (2006.01)
*H04N 5/14*    (2006.01)
*H04N 5/57*    (2006.01)

(52) U.S. Cl. .................. 345/87; 348/673; 348/687

(58) Field of Classification Search ................ 348/672, 348/62, 625, 673, 687–689; 345/101, 204, 345/690, 77, 87–111
See application file for complete search history.

(56) References Cited

U.S. PATENT DOCUMENTS

| | | | | |
|---|---|---|---|---|
| 5,003,394 A | | 3/1991 | Lagoni | |
| 5,210,610 A | * | 5/1993 | Kanashiki et al. | 348/672 |
| 6,072,458 A | * | 6/2000 | Asakawa et al. | 345/101 |
| 6,160,576 A | * | 12/2000 | Higuchi et al. | 348/62 |
| 6,285,349 B1 | * | 9/2001 | Smith | 345/204 |
| 6,330,038 B1 | * | 12/2001 | Johnson | 348/325 |

FOREIGN PATENT DOCUMENTS

| | | |
|---|---|---|
| EP | 0 467 373 | 1/1992 |
| EP | 0 784 399 A1 | 7/1997 |
| JP | 59-61283 | 4/1984 |
| JP | 5-75899 | 3/1993 |

* cited by examiner

*Primary Examiner*—Richard Hjerpe
*Assistant Examiner*—Srilakshmi K Kumar
(74) *Attorney, Agent, or Firm*—Oblon, Spivak, McClelland, Maier & Neustadt, P.C.

(57) ABSTRACT

Specific image quality adjustment of an image is performed according to a setting made by a user, and contrast compensation is performed such that a brightness is kept unchanged at the center of a specific color region larger than a predetermined size, regardless of the setting of the image quality adjustment. The image quality adjustment is performed by selecting one of a plurality of filters with different frequency characteristics according to the setting of the image quality adjustment, and then performing filter processing on the image by using the selected filter. The contrast compensation is performed upon the image that has undergone the filter processing, by using a contrast compensation value related to the selected filter.

21 Claims, 8 Drawing Sheets

TEST PATTERN FOR DETERMINING CONTRAST COMPENSATION VALUE

INPUT DV

BEFORE FILTERING DV1

AFTER FILTERING DV2

AFTER CONTRAST COMPENSATION DV3

A SETUP MENU FOR ADJUSTMENT VALUES

METHOD AND APPARATUS FOR ADJUSTING QUALITY OF A DISPLAYED IMAGE

CROSS-REFERENCE TO RELATED DOCUMENTS

The present document is a continuation which claims priority on and is based on PCT/JP00/03629 filed Jun. 2, 2000, which in turn claims priority on and is based on JP 11-159021, the entire contents of both of which are incorporated herein by reference.

BACKGROUND OF THE INVENTION

1. Field of the Invention

The present invention relates to a technology for adjusting the quality of a displayed image.

2. Discussion of the Background

Sharpness adjustment is one of well-known methods of image processing. In some image display apparatuses such as projectors, the sharpness adjustment can be setup by users. When performing the sharpness adjustment, image quality can be improved by enhancing sharpness of a diffused image, or by removing high frequency noises at the more or less sacrifice of sharpness (acutance).

Various filters with different frequency characteristics are used in the sharpness adjustment, such as a smoothing filter or a differential filter. For example, a smoothing filter is used to remove high frequency noises contained in an image, and a differential filter is used to punctuate edges of an image by amplifying high frequency components.

However, in typical sharpness adjustment, not only is the sharpness of an image adjusted, but contrast and brightness of an image are also affected. Accordingly, there arises a problem that when the set value of sharpness adjustment is changed by a user, contrast and brightness of an image will then be varied also. This problem is not limited to a case of performing sharpness adjustment, and is a common problem found in adjustments of various image qualities other than contrast and brightness.

SUMMARY OF THE INVENTION

The present invention addresses the above-mentioned and other problems in the background arts, and an object thereof is to provide a novel technology that can reduce the influence which image quality adjustment makes upon contrast or brightness of an image.

In order to achieve at least part of the above-mentioned object, the present invention performs an adjustment of specific image quality other than contrast and brightness according to a set value setup by a user. At the same time, the present invention also compensates the contrast of the image such that brightness is substantially maintained or kept unchanged at a center of a specific color region which is larger than a predetermined size, regardless of the set value of the image quality adjustment. The "contrast compensation" here is synonymous with "contrast adjustment".

By performing such contrast compensation, brightness at the center of the specific color region is substantially kept unchanged regardless of the set value of image quality adjustment, and therefore the influence of image quality adjustment upon contrast and brightness of the image is suppressed to a low level.

In the present invention, brightness of the region which is smaller than the predetermined size or which is not of the specific color is permitted to vary along with the change of the set value of image quality adjustment. This is also the same with periphery portions of the specific color region larger than the predetermined size. However, at a center of the sufficiently large specific color region larger than the predetermined size, brightness therein is substantially kept unchanged even when the set value of image quality adjustment is changed. Whether or not a region of the specific color within an image corresponds to "a specific color region larger than a predetermined size" can be determined by examining whether or not the brightness at its center is substantially kept unchanged when the set value of image quality adjustment is changed.

The specific image quality adjustment is, for example, sharpness adjustment. In the sharpness adjustment, contrast and brightness of the image tend to vary easily, so that the above-mentioned contrast compensation will attain excellent effects.

The specific color may be white as an example. Because the white color has the greatest displayable brightness, it is thus possible to suppress changes of contrast and brightness in other regions with different colors by performing the contrast compensation such that the brightness at the centers of the white regions is substantially kept unchanged.

The image quality adjustment may be performed by selecting one of a plurality of filters with different frequency characteristics, according to the set value of image quality adjustment, and then performing a filtering process of an image by using the selected filter. Additionally, the contrast compensation may also be performed upon the image that has undergone the filter processing, with a contrast compensation value related to the selected filter in advance.

In this way, the contrast compensation can be easily performed such that brightness in the specific color region within the image is substantially kept unchanged.

It is preferable that the contrast adjustment of an image is carried out independently of the contrast compensation.

In this way, it is possible to independently perform contrast adjustment and specific adjustment of image quality other than contrast and brightness, thereby enhancing the image quality of the image.

The present invention can be realized in various ways including: a method and an apparatus for image processing; a method and an apparatus for displaying an image; a computer program for implementing functions of the methods and the apparatus; a recording medium on which the computer program is stored; a data signal embodied in a carrier wave including the computer program.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A. General Structure of the Apparatus

Figure 1:
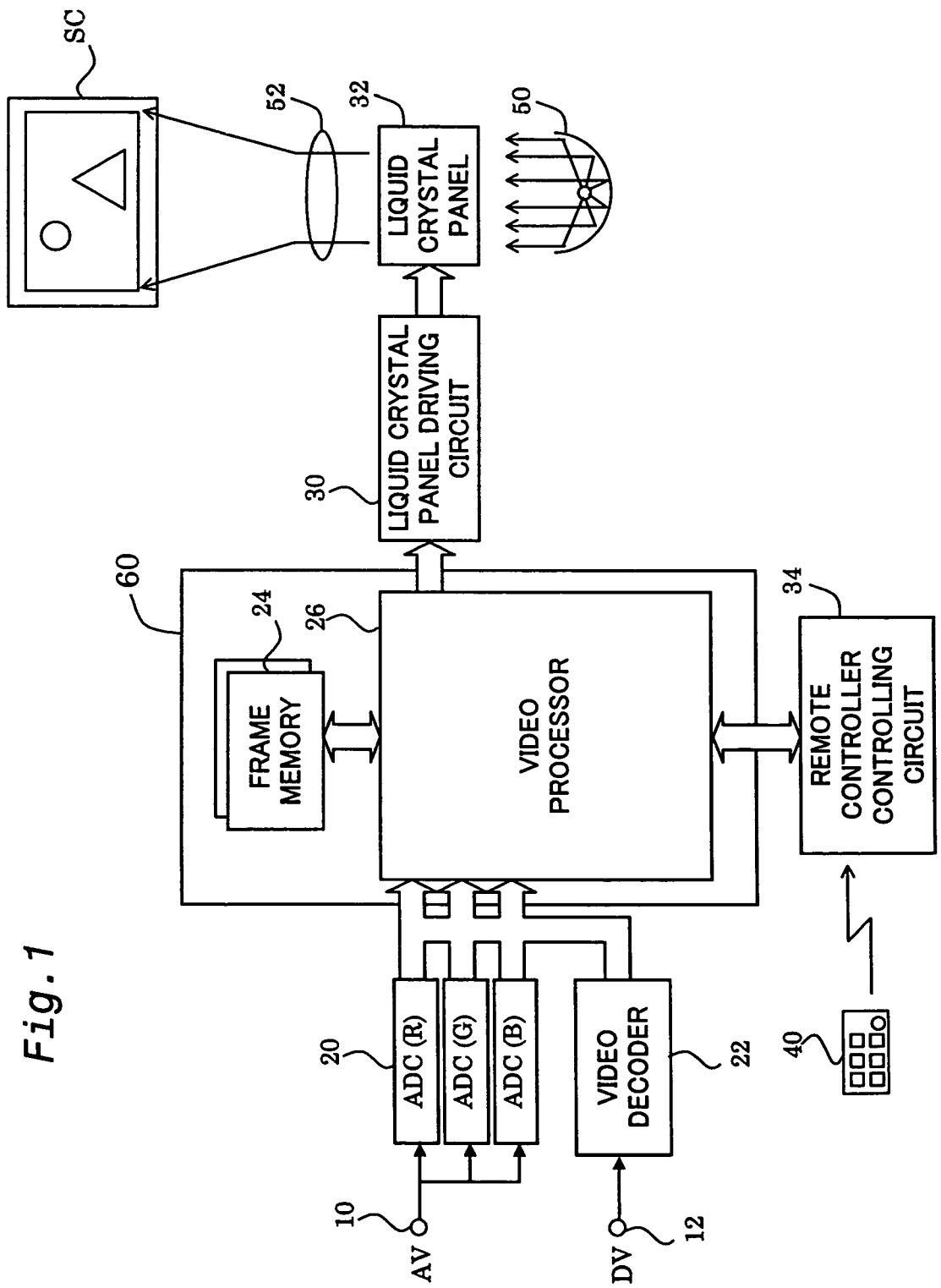
FIG. 1 is a block diagram illustrating the general structure of an image display apparatus as an embodiment according to the present invention.

Embodiments of the present invention are described with examples. FIG. 1 is a block diagram illustrating the general structure of an image display apparatus as an embodiment according to the present invention. The image display apparatus is a computer system including: an analog image input terminal 10; a digital image input terminal 12; an A-D converter 20; a video decoder (a synchronizing separator circuit) 22; a frame memory 24; a video processor 26; a liquid crystal panel driving circuit 30; a liquid crystal panel 32; and a remote controller controlling circuit 34. The frame memory 24 and the video processor 26 can be integrated to be an integrated circuit 60 dedicated for image processing.

This image display apparatus is a projector or so-called projection display apparatus including: an illumination device 50 for illuminating the liquid crystal panel 32; and a projection optical system 52 that projects image light emitted from the liquid crystal panel 32 onto a screen SC. The liquid crystal panel 32 is used as a light valve (a light modulator) that modulates the light emitted from the illumination system 50. In this projection display apparatus, the liquid crystal panel 32, the illumination system 50, and the projection optical system 52 correspond to an image display section in the present invention.

Although not illustrated, the image display apparatus has three liquid crystal panels 32 corresponding to the three colors of R, G, and B. Additionally, each circuit, which will be described later, has a function to process three components of image signals corresponding to the three colors. The illumination system 50 has a color light separating optical system that separates white light into lights of the three colors. Additionally, the projection optical system 52 has a synthesis optical system that synthesizes image light of the three colors to generate image light representing a color image. The optical system structure of such a projection display apparatus is described in detail in JPA Hei 8-352003 disclosed by the applicants of the present invention, the entire contents of which are hereby incorporated herein by reference, and further descriptions are omitted here.

An input image signal is selected from an analog image signal AV input to the analog image input terminal 10 and a digital image signal DV input to the digital image input terminal 12. The analog image signal AV is converted by the A-D converter 20 into digital image signals that include image signal components of the three colors R, G, B.

Image signals input to the video processor 26 are temporarily written in the frame memory 24, and are then read out from the frame memory 24 to be supplied to the liquid crystal panel driving circuit 30. The video processor 26 performs various kinds of image processing upon the input image signals during the writing and reading. The liquid crystal panel driving circuit 30 generates a drive signal for driving the liquid crystal panel 32 in response to the given image signals. The liquid crystal panel 32 modulates illumination lights in response to the drive signal.

A user can input with the remote controller 40 set values for various adjustments 2 related to the image displaying, such as sharpness adjustment, contrast adjustment, and brightness adjustment, which will be described later. Additionally, although not shown, the image display apparatus itself is also equipped with keys or buttons for inputting various set values for image displaying.

B. Internal Structure of the Video Processor 26

Figure 2:
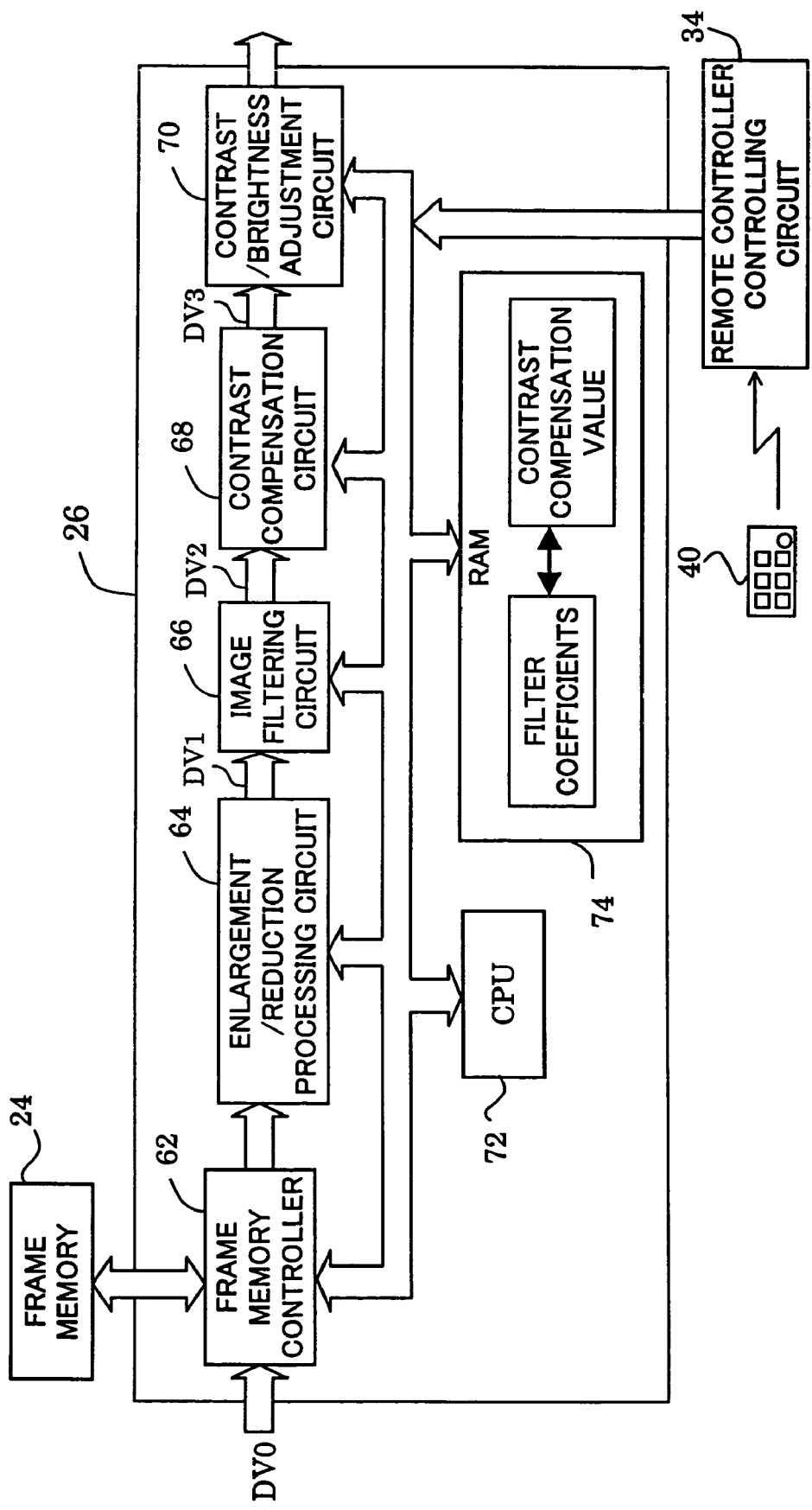
FIG. 2 is a block diagram illustrating the internal structure of a video processor in the present invention.

FIG. 2 is a block diagram illustrating the internal structure of the video processor 26. The video processor 26 includes: a frame memory controller 62; an enlargement/reduction processing circuit 64; an image filtering circuit 66; a contrast compensation circuit 68; a contrast/brightness adjustment circuit 70; CPU 72; and RAM 74.

The frame memory controller 62 controls the writing of a digital image signal DV0 supplied from the A-D converter 20 or the video decoder 22 shown in FIG. 1 into the frame memory 24, and the reading of the digital image signal from the frame memory 24. The enlargement/reduction processing circuit 64 has a function to perform enlargement or reduction of an image according to a setting by the user, as well as to perform interpolation, if required, while performing the enlargement or the reduction.

The image filtering circuit 66 is a digital filter for performing sharpness (acutance) adjustment of an image according to a setting by the user. The contrast compensation circuit 68 is a circuit for compensating contrast of a digital image signal that has undergone filter processing. The term "contrast compensation" used here in the description of the present invention is synonymous with the term "contrast adjustment". The details of processes in the image filtering circuit 66 and the contrast compensation circuit 68 are described later. Filter coefficients used in the image filtering circuit 66 and compensation values used in the contrast compensation circuit 68 are associated with each other and are stored in the RAM 74.

The contrast/brightness adjustment circuit 70 is a circuit for adjusting contrast and brightness of an image according to a setting by the user. The adjustment of contrast in the contrast/brightness adjustment circuit 70 is performed independent of the contrast adjustment performed in the contrast compensation circuit 68.

Figure 3:
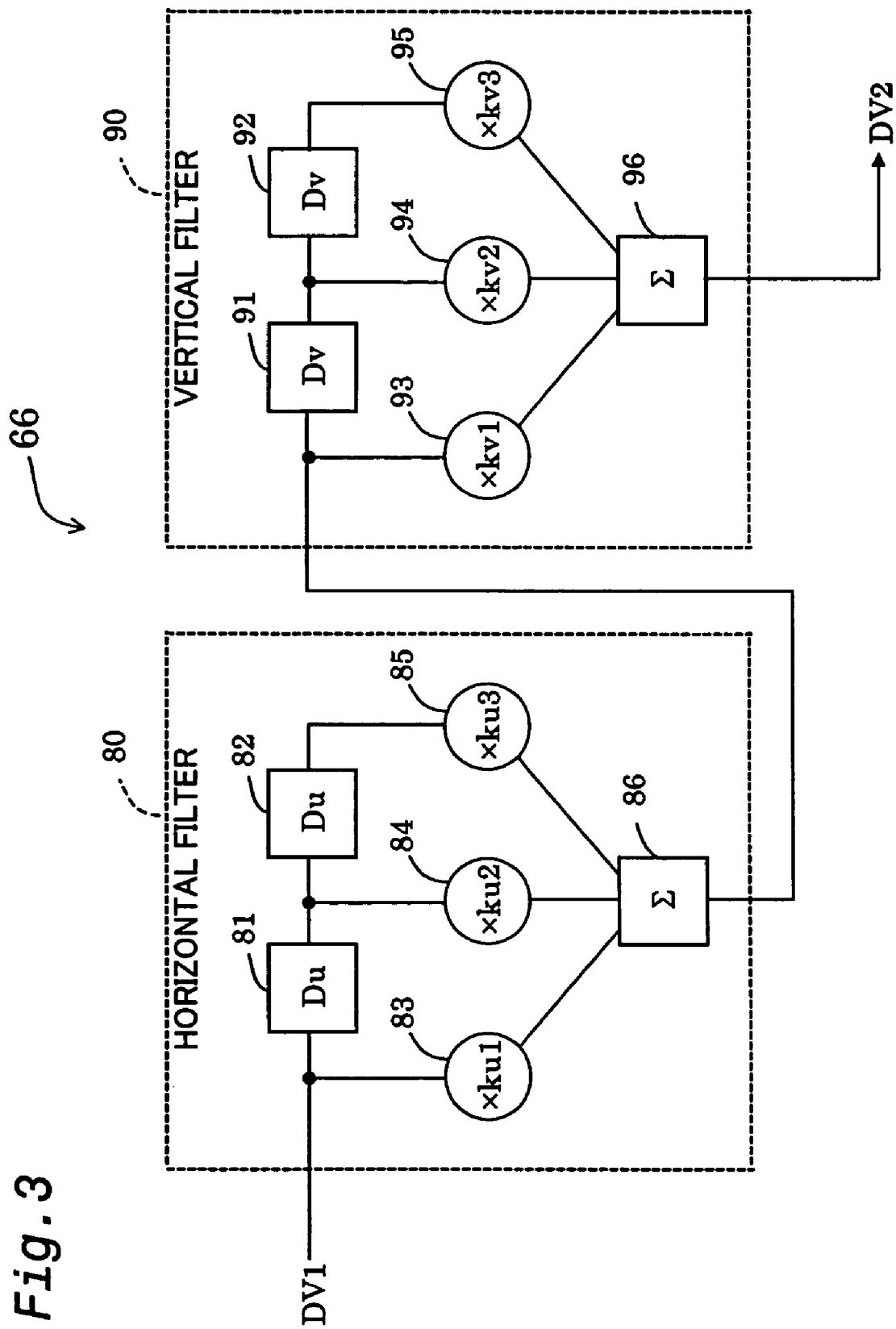
FIG. 3 is a block diagram illustrating the internal structure of an image filter circuit in the present invention.

FIG. 3 is a block diagram illustrating the internal structure of the image filtering circuit 66. The image filtering circuit 66 is a two-dimensional filter constituted by a horizontal filter 80 and a vertical filter 90 which are connected in series. The horizontal filter 80 is a three-tap FIR filter (finite impulse response filter) constituted by two horizontal delay circuits 81, 82, three multipliers 83-85, and an adder 86. The vertical filter 90 also has a structure similar to the horizontal filter 80. However, the delay Du of the horizontal delay circuits 81, 82 in the horizontal filter 80 corresponds to one pixel while the delay Dv of the two vertical delay circuits 91, 92 in the vertical filter 90 corresponds to one scanning line.

Values ku1-ku3 and kv1-kv3, which are multiplied in the multipliers 83-85 and 93-95, respectively, constitute one set of filter coefficients. In the RAM 74 shown in FIG. 2, plural sets of filter coefficients are stored for realizing a plurality of filters with different frequency characteristics.

It is possible to realize various image filters with different frequency characteristics by changing the filter coefficients ku1-ku3 and kv1-kv3. For example, a low pass filter (smoothing filter) can be realized by the following filter coefficients:

Ku1=ku3=kv1=kv3=¼; and
Ku2=kv2=½.

A high pass filter can be realized by the following filter coefficients:
Ku1=ku3=kv1=kv3=−¼; and
Ku2=kv2=½.

In the example shown in FIG. 3, each of the horizontal filter 80 and the vertical filter 90 is constituted by a three-tap FIR filter. On the practical applications, however, it is preferable to use a FIR filter having 16 to 512 taps, for example. By using a filter with a large number of taps, it is possible to realize various filter characteristics appropriate for the sharpness adjustment of an image. When using a filter with a large number of taps, various image improvement effects including sharpness can be realized by setting up filter coefficients and window functions in an appropriate way. The number of taps in the horizontal filter 80 and in the vertical filter 90 may be different from one another. It is also possible to use filters other than FIR filters as image filters.

Figure 4:
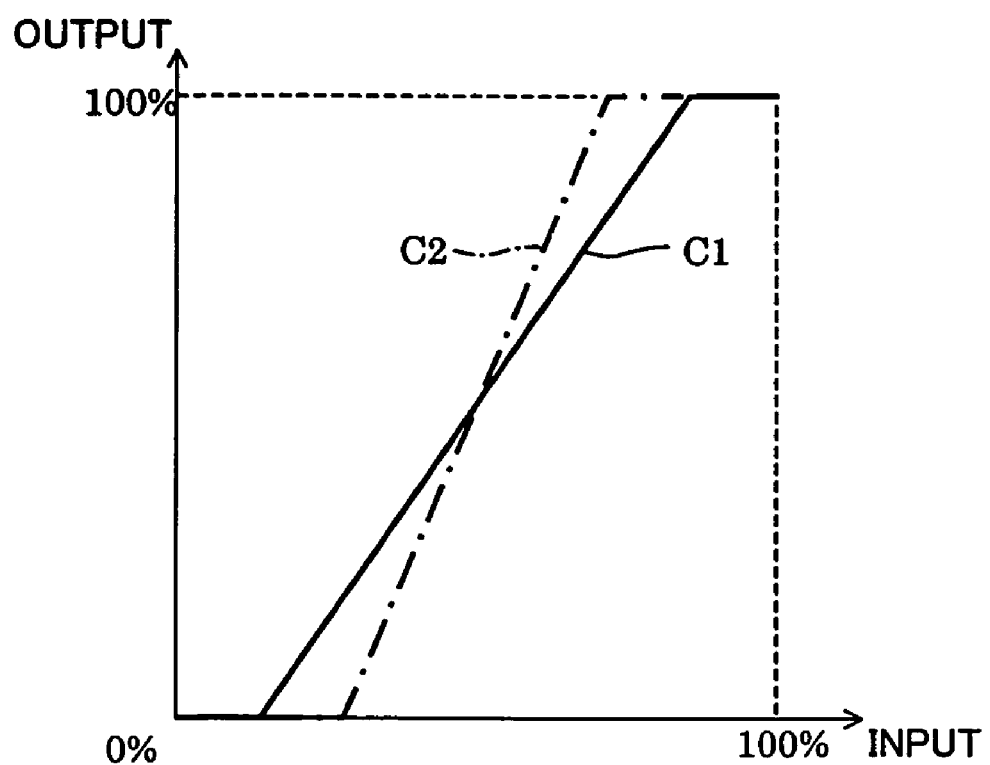
FIG. 4 illustrates the input/output characteristics of a contrast compensation circuit in the present invention.

A digital image signal DV2 that has undergone filter processing then has its contrast adjusted by the contrast compensation circuit 68. FIG. 4 illustrates input/output characteristics (contrast compensation characteristics) of the contrast compensation circuit 68. In FIG. 4, two contrast compensation characteristics C1, C2 with different gradients are indicated with a solid line and a dashed line respectively. As can be understood from the illustration in FIG. 4, the contrast compensation characteristics are typically capable of enhancing contrast of an image. The reason is that, as described later, the main objective of the contrast compensation circuit 68 is to recover (that is to compensate) contrast of an image that is lowered during the filter processing.

It is possible to establish a plurality of contrast compensation characteristics for the contrast compensation circuit 68. The plurality of contrast compensation characteristics is indicated by contrast compensation values. The term "contrast compensation value" in this specification is a value indicating one of the plurality of contrast compensation characteristics available.

Figure 5A:
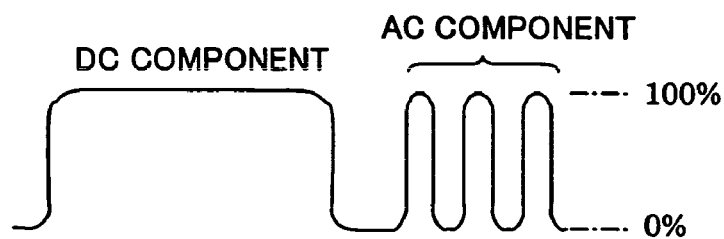
FIGS. 5(a)-5(d) illustrate a relationship between filter processing and contrast compensation in the present invention.

FIGS. 5(a)-5(d) illustrate relationships between the filter processing and the contrast compensation. FIG. 5(a) illustrates a signal waveform of a digital image signal DV input to the image display apparatus. The image represented by this image signal DV is assumed to have a DC component region (a region with approximately constant brightness) and AC component regions (regions with abruptly changing brightness). It is also assumed that the greatest and the lowest brightness are 100% and 0% respectively in both the DC component region and the AC component regions. To be more exact, the waveform such as illustrated in FIG. 5(a) is one formed at an output terminal of an image signal supplier device, such as a personal computer that supplies image signals to the image display apparatus.

Figure 5B:
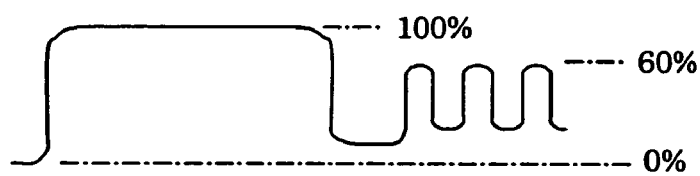
Figure 5C:
Figure 5D:
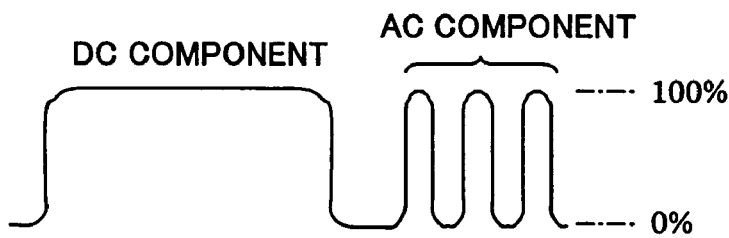

This image signal DV decays as passing through various wirings and circuits. When the image signal DV is input to the image filtering circuit 66, the AC component regions are mainly decayed as illustrated in FIG. 5(b). Suppose the image signal DV1 shown in FIG. 5(b) is directly used for displaying an image, an image with low sharpness (acutance) will then be observed, for the AC components (especially the components with high frequency) of the signal have been decayed. Therefore, the user can adjust sharpness by using the image filtering circuit 66, so that the sharpness in the DC component region and the AC component regions become approximately at an identical level, as shown in FIG. 5(c). However, the filter processing not only varies sharpness of the image, but also affects contrast and brightness of the image. Concretely, contrast and brightness of the image is reduced as a result of the filter processing, as shown in FIG. 5(c). It is thus possible to adjust contrast by using the contrast compensation circuit 68, so that the contrast and the brightness after the filter processing can be maintained and recover to approximately the same level with the original digital image signal DV. As a result of this process, spatial frequency bands are raised by the high pass filter.

Figure 6:
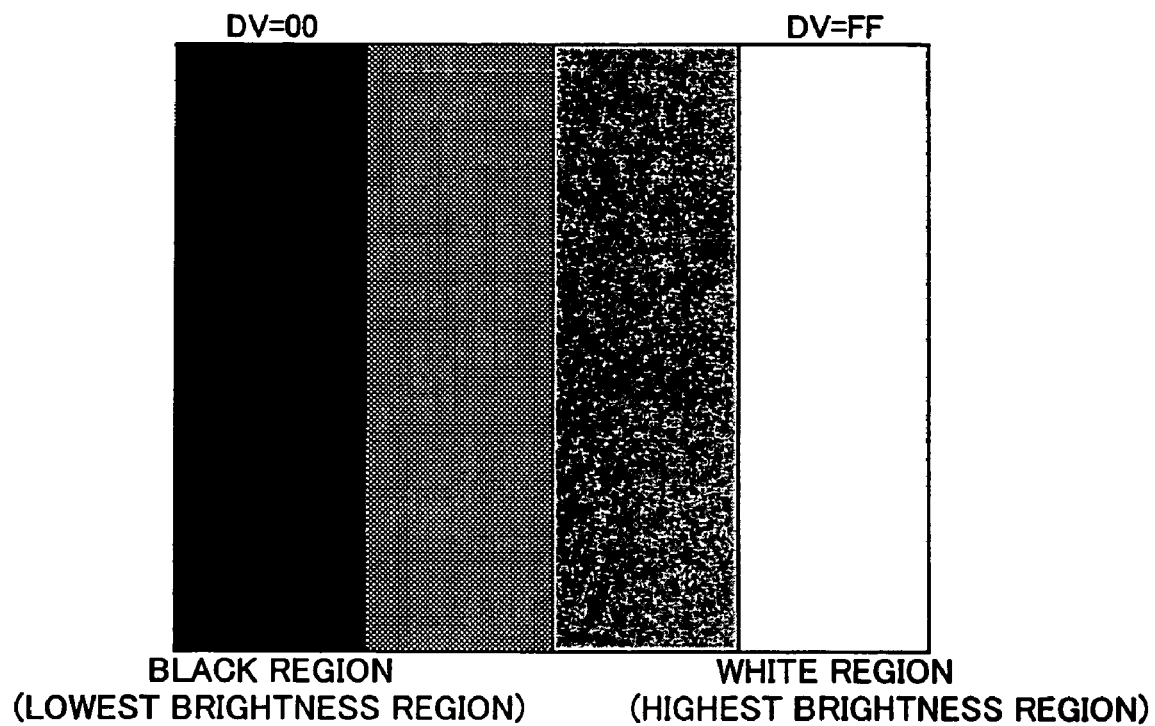
FIG. 6 illustrates a test pattern used when determining a contrast compensation value in the present invention.

FIG. 6 illustrates a test pattern used in determining a contrast compensation value. The test pattern contains a white region and a black region. The white region has the greatest brightness, where all signal values for three colors RGB of image signals DV have the greatest value "FF" (in hexadecimal notation) in their dynamic range. The black region has the smallest brightness, where all signal values for three colors RGB of image signals DV have the smallest value "00" in their dynamic range. The test pattern shown in FIG. 6 also includes regions with half tone in addition to the white region and the black region, but the half tones regions may be omitted.

In determining a contrast compensation value, a test pattern such as shown in FIG. 6 is displayed onto a screen SC (FIG. 1), then an illuminance meter is placed approximately on the center of a white region in the test pattern to measure the illuminance. The illuminance of the white region on the screen SC is used as an index value that indicates brightness of the brightest region on the liquid crystal panel 32. Next, the set of filter coefficients used in the image filtering circuit 66 is changed, while a contrast compensation value is determined for each set of filter coefficients such that the measured illuminance at the center of the white region is substantially kept unchanged. In this way, even when the sharpness adjustment value is changed by the user and the filter coefficients are also varied accordingly, the brightness at the center of the white region in the displayed image can still be substantially maintained or kept unchanged. The terms "maintained" or "being substantially kept unchanged" means that the value is kept unchanged within a range of about ±5%. It is preferable, however, to maintain the brightness at the center of the white region within a range of about ±3%.

It is possible to determine the contrast compensation value such that the brightness at the center of the black region is substantially kept unchanged. In the black region, however, it is difficult to distinguish little differences of brightness with the naked eye. Therefore, the determination of the contrast compensation value is performed such that at least the brightness at the center of the white region is substantially kept unchanged.

However, it is also possible to perform contrast compensation such that the contrast (a ratio of greatest brightness to smallest brightness) itself is substantially kept unchanged instead of maintaining brightness of the white region. It is most preferable to perform the contrast compensation such that the brightness of the white region and the contrast (a ratio of greatest brightness to smallest brightness) are both substantially kept unchanged.

On the other hand, in regions with white color but of substantially small size, the brightness at the center may not be substantially kept unchanged despite the contrast compensation. The reason is that in regions smaller than the substantial filter size of the image filter as a spatial filter, brightness therein is considerably affected by brightness in adjacent regions, so that brightness values after the contrast compensation would vary in response to brightness of adjacent regions. The term "substantial filter size" used here means a size of the filter that is constituted by pixels with non-zero filter coefficients. The white regions where brightness is substantially kept unchanged after the contrast compensation are regions which are larger than the filter size of the image filter. For example, the image filter illustrated in FIG. 3 is a spatial filter with 3×3 pixels. When this image filter is used, the contrast compensation will substantially maintain brightness in regions which are larger than 3×3 pixels. In a case of using an FIR filter having about eighty-taps as a horizontal or a vertical filter, brightness at the center of white regions larger than about 80×80 pixels will be substantially kept unchanged.

As can be understood from the above descriptions, at peripheries of each white region of a sufficiently large size, there is some possibility that the brightness therein is not kept unchanged even through the contrast compensation. Furthermore, the brightness of non-white regions of a sufficiently large size may not be kept unchanged. Practically speaking, however, brightness is often kept unchanged even at the center of non-white regions.

For the same reason as stated above, it is also preferable to set the sizes of the white region and the black region of the test pattern larger than the substantial filter size, which is a size of the image filter constructed as a spatial filter.

Figure 7:
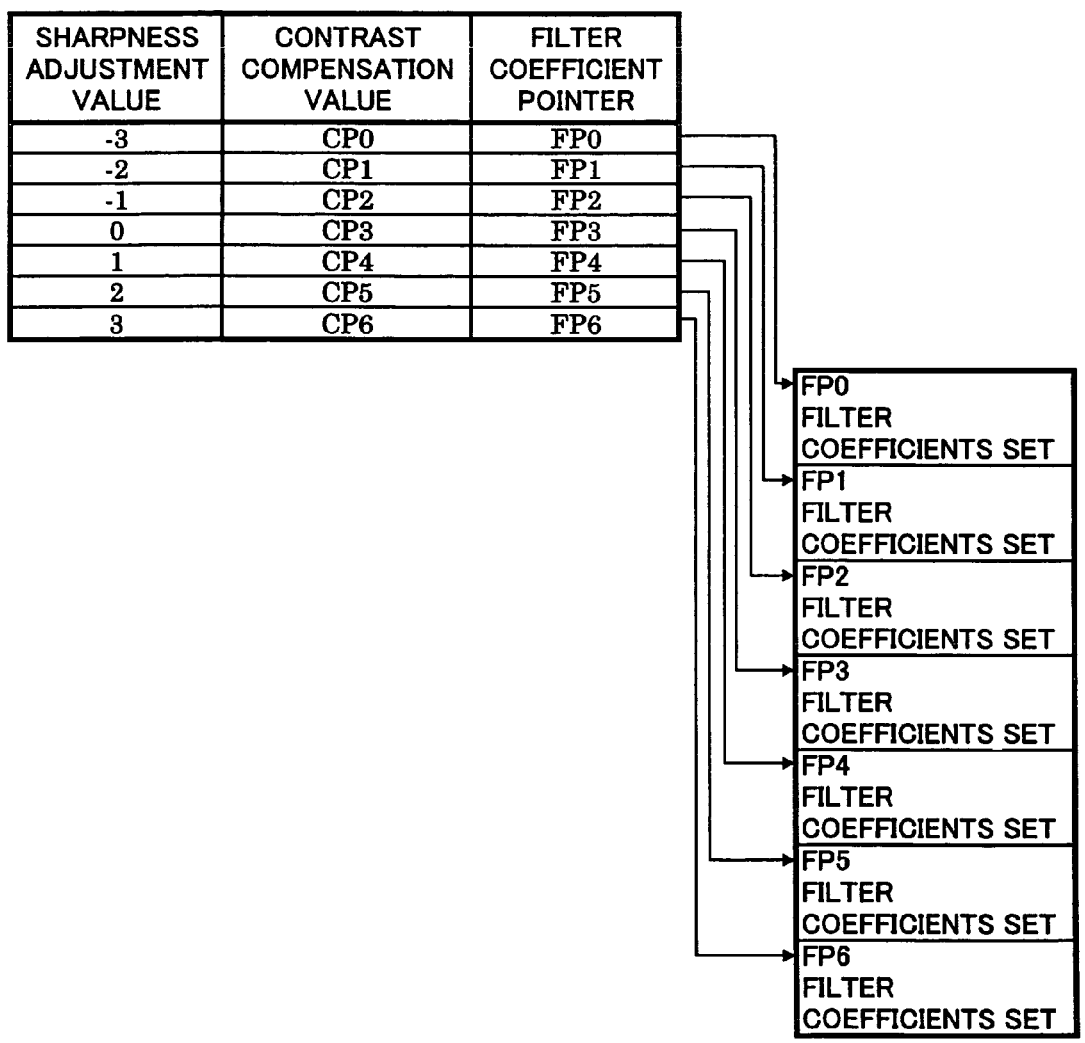
FIG. 7 illustrates a relationship between each set of filter coefficients stored in a RAM of FIG. 2 and a contrast compensation value in the present invention.

FIG. 7 illustrates a relationship between plural sets of filter coefficients stored in RAM 74 (FIG. 2) and contrast compensation values. Sharpness adjustment values are set by a user with the remote controller 40. In an example illustrated in FIG. 7, it is assumed that the user can set the sharpness adjustment value at one of seven levels ranging from −3 to +3. If the sharpness adjustment value is −3, for example, the image filtering circuit 66 functions as a smoothing filter that lowers sharpness of images. On the other hand, if the sharpness adjustment value is +3, the image filtering circuit 66 functions as a sharpness emphasis filter that enhances sharpness of images. The seven levels of the sharpness adjustment value are related to seven contrast compensation values CP0-CP6, respectively, and to seven filter coefficient pointers FP0-FP6, respectively, that indicate addresses of seven sets of filter coefficients.

Figure 8:
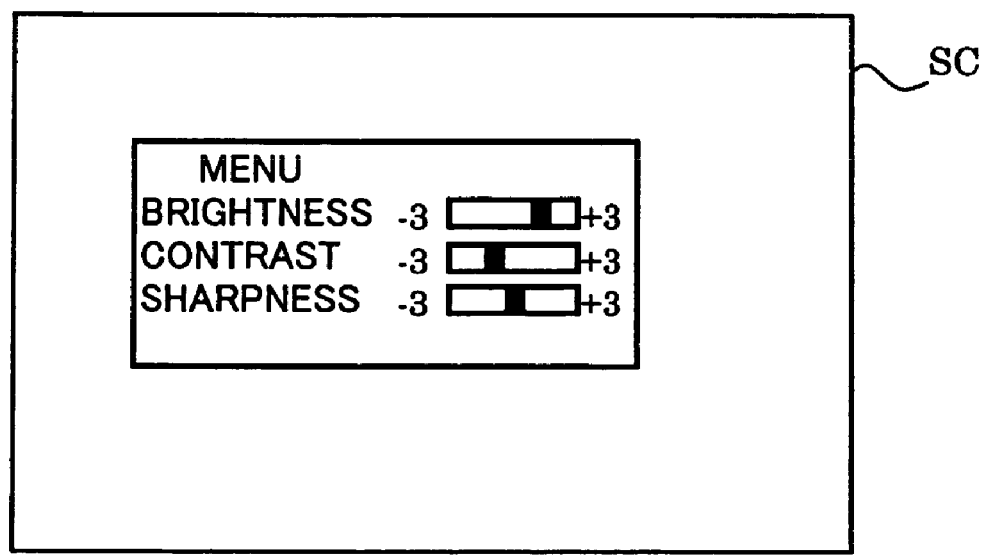
FIG. 8 illustrates an example of a setup menu for adjustment values used by a user to adjust display conditions in the present invention.
Figure 8:
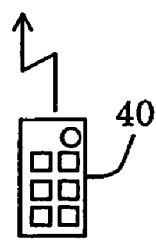

FIG. 8 illustrates an example of a setup menu for adjustment values, which is used by a user to adjust display conditions. In this example, a user can operate the remote controller 40 to display the setup menu for adjustment values such as shown in FIG. 8, in order to independently set brightness, contrast, and sharpness of image.

When one sharpness adjustment value is selected by a user, one set of filter coefficients (FIG. 7) is then selected by a filter coefficient pointer corresponding to the adjustment value, and the selected set of filter coefficients is set in the image filtering circuit 66. At the same time, the contrast compensation value that corresponds to the sharpness adjustment value is set in the contrast compensation circuit 68. As a result, the filter processing and the contrast compensation of the image are performed using the set of filter coefficients and the contrast compensation value that are associated with each other in advance.

As described with reference to FIG. 6, the contrast compensation value is determined such that brightness of white regions within an image are substantially kept unchanged regardless of the filter coefficients used. Therefore, even if the sharpness adjustment value is changed by a user, it appears that the contrast and the brightness of the whole image is not significantly changed while only the sharpness is changed. It is thus possible to display a high quality image with appropriate sharpness without significantly affecting the contrast and the brightness of the image.

Some display images do not include white regions with sufficiently large areas. In such cases, brightness of the brightest region in the display image will be kept unchanged regardless of sharpness adjustment if the region has a sufficiently large size larger than the filter size of the image filter.

Furthermore, a user can also set a contrast adjustment value and a brightness adjustment value in the contrast/brightness adjustment circuit 70 (FIG. 2), using the setup menu for adjustment values shown in FIG. 8. The contrast adjustment in the contrast/brightness adjustment circuit 70 is performed independent of the contrast adjustment in the contrast compensation circuit 68. The user thus can voluntarily adjust contrast of the image using the contrast/brightness adjustment circuit 70. In this way, the user can independently adjust sharpness, brightness, and contrast of image, respectively, to display an image with high image qualities.

As described above, according to the above-mentioned embodiment, when a user adjusts sharpness, the brightness is kept unchanged at the center of high-brightness regions with sufficiently large areas in the displayed image regardless of the setting of the sharpness adjustment. Therefore, it is possible to enhance image quality through the sharpness adjustment without significantly affecting contrast and brightness of the image.

In general, a spatial frequency of a region decreases as the region becomes larger, and the spatial frequency increases as the region becomes smaller. Therefore, through the filter processing using a high pass filter in the above-mentioned example, brightness is kept unchanged in the regions with a low spatial frequency while edges and borders are emphasized in the regions with a high spatial frequency.

The present invention is not limited to the above-mentioned examples or embodiments, and it may be implemented in various embodiments without departing from the scope of the present invention. It is possible to make, as examples only, modifications (1)-(6) as follows.

(1) In the above embodiments, the contrast compensation is performed along with the sharpness adjustment, but the present invention is also applicable to other image quality adjustments other than the sharpness adjustment. In other words, the present invention is applicable to a case in which contrast compensation is performed along with specific adjustment of an image quality other than contrast and brightness.

(2) In the above-mentioned embodiments, the contrast compensation is performed such that brightness is kept unchanged at the center of white regions. Alternatively, it may be performed such that brightness is kept unchanged at the center of a specific color region other than white (red for example). That is, the contrast compensation may be performed such that the brightness is kept unchanged at the center of a specific color region which is larger than a predetermined size.

(3) Although a two-dimensional image filter is used in the above-mentioned embodiment, the present invention is also applicable to a case in which a one-dimensional image filter is used. In addition, it is also possible to adapt various filter structures other than the simple FIR filter. Furthermore, a digital filter is used in the above examples, but the present invention is also applicable to a case in which an analog filter is used.

(4) Although the structure of the projection display apparatus employing transmission-type liquid crystal panels is described in the above embodiment, the present invention is also applicable to other types of projection display apparatus. Examples of other types of projection display apparatus include ones employing a reflection-type liquid crystal panel, ones employing a Micro-Mirror Device (trademark of Texas Instruments), and ones employing a CRT.

The present invention is also applicable to an image display apparatus other than a projection display apparatus. For example, the present invention is also applicable to an image display apparatus with a direct-view image display device, such as a liquid crystal panel, a plasma display panel, or CRT, or to an image display apparatus, such as a head mount display device, that enlarges an image such that an enlarged virtual image is observed by a user.

(5) Part of the structure realized by hardware in the above embodiments may be implemented with software, and, on the contrary, part of the structure realized by software may be implemented by hardware. For example, it is possible to implement the functions of the image filtering circuit 66 and the contrast compensation circuit 68 shown in FIG. 2 by means of computer programs.

Such computer programs are provided in a form stored on a recording medium. The "recording medium" includes various computer readable mediums, such as flexible disks, CD-ROMs, magneto-optic disks, IC cards, ROM cartridges, punch cards, printed matter with codes such as bar codes printed thereon, internal storages (memories such as RAM or ROM), external storages of computers, carrier waves for communication, etc.

(6) The functions of the image filtering circuit 66 and the contrast compensation circuit 68 may also be realized by one circuit or one program. That is, in the present invention, contrast is compensated such that brightness is substantially kept unchanged at the center of a specific color region larger than a predetermined size, regardless of the set value of specific image adjustment other than contrast and brightness adjustments.

The present invention is applicable to various types of image display apparatuses such as projection type display apparatuses and direct-view type display apparatuses, and also to image processing devices therefor.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. An image display apparatus, comprising:
an image display device configured to display an image;
a setting section configured to allow a user to directly set image quality adjustment excluding contrast and brightness adjustments of the image; and
an image processing section configured to perform the image quality adjustment of the image according to the setting made by the user, and to perform contrast compensation to maintain a brightness at a center of a specific color region larger than a predetermined size within the image displayed by the image display device, regardless of the setting of the image quality adjustment.

2. An image display apparatus in accordance with claim 1, wherein the image quality adjustment is a sharpness adjustment.

3. An image display apparatus in accordance with claim 1, wherein the specific color is white.

4. An image display apparatus in accordance with claim 1, wherein the image processing section includes:
an image filter configured to perform the image quality adjustment by selecting one of a plurality of filters with different frequency characteristics according to the setting of the image quality adjustment, and to perform filter processing on the image using the selected filter; and
a contrast compensation section configured to perform the contrast compensation upon the image that has undergone the filter processing, using a contrast compensation value related to the selected filter.

5. An image display apparatus in accordance with claim 4, further comprising a contrast adjustment section configured to perform contrast adjustment of the image independently of the contrast compensation section.

6. An image processing device, comprising:
an image filter configured to perform filter processing of an image by using a selected one of a plurality of filters with different frequency characteristics, the selected filter being selected based on a user directly setting image quality adjustment excluding contrast and brightness adjustment of the image; and
a contrast compensation section configured to perform contrast compensation using a contrast compensation value, related to the selected filter, to maintain a brightness at a center of a specific color region larger than a predetermined size within an image that has undergone the filter processing, regardless of which filter is selected from the plurality of filters.

7. An image processing device in accordance with claim 6, wherein the specific color is white.

8. An image processing device in accordance with claim 6, further comprising a contrast adjustment section configured to perform contrast adjustment of the image independently of the contrast compensation section.

9. An image display apparatus, comprising:
means for displaying an image;
means for allowing a user to directly set image quality adjustment excluding contrast and brightness adjustments of the image; and
means for performing the image quality adjustment of the image according to the setting made by the user, and for performing contrast compensation to maintain a brightness at a center of a specific color region larger than a predetermined size within the image displayed, regardless of the setting of the image quality adjustment.

10. An image display apparatus in accordance with claim 9, wherein the means for performing image quality adjustment includes:
means for performing the image quality adjustment by selecting one of a plurality of filter means with different frequency characteristics according to the setting of the image quality adjustment, and for performing filter processing on the image using the selected filter means; and
contrast compensation means for performing the contrast compensation upon the image that has undergone the filter processing, using a contrast compensation value related to the selected filter means.

11. An image display apparatus in accordance with claim 10, further comprising contrast adjustment means for performing contrast adjustment of the image independently of the contrast compensation means.

12. An image processing device, comprising:
means for performing filter processing of an image by using a selected one of a plurality of filter means with different frequency characteristics, the selected filter means being selected based on a user directly setting image quality adjustment excluding contrast and brightness adjustment of the image; and
contrast compensation means for performing contrast compensation using a contrast compensation value, related to the selected filter means, to maintain a brightness at a center of a specific color region larger than a predetermined size within an image that has undergone the filter processing, regardless of which filter means is selected from the plurality of filter means.

13. An image processing device in accordance with claim 12, further comprising contrast adjustment means for performing contrast adjustment of the image independently of the contrast compensation section.

14. A method of displaying an image on an image display device, comprising the steps of:
   (a) directly setting a set value for image quality adjustment excluding contrast and brightness adjustments of the image; and
   (b) performing the image quality adjustment on the image according to the setting, and performing contrast compensation to maintain a brightness at a center of a specific color region larger than a predetermined size within an image displayed by the image display device, regardless of the setting of the image quality adjustment.

15. A method in accordance with claim 14, wherein the image quality adjustment is a sharpness adjustment.

16. A method in accordance with claim 14, wherein the specific color is white.

17. A method in accordance with claim 14, wherein the step (b) comprising the steps of:
   (b1) performing the image quality adjustment by selecting one of a plurality of filters with different frequency characteristics according to the setting of the image quality adjustment, and performing filter processing on the image using the selected filter; and
   (b2) performing the contrast compensation upon the image that has undergone the filter processing, using a contrast compensation value related to the selected filter.

18. An image displaying method in accordance with claim 17, further comprising the step of (c) performing contrast adjustment of the image independently of the step (b2).

19. A method of processing image, comprising the steps of:
   (a) performing filter processing of an image by using a selected one of a plurality of filters with different frequency characteristic, the selected filter being selected based on a user directly setting image quality adjustment excluding contrast and brightness adjustment of the image; and
   (b) performing contrast compensation using a contrast compensation value, related to the selected filter, to maintain a brightness at a center of a specific color region larger than a predetermined size within an image that has undergone the filter processing, regardless of which filter is selected from the plurality of filters.

20. A method in accordance with claim 19, wherein the specific color is white.

21. A method in accordance with claim 19, further comprising the step of (c) performing contrast adjustment of the image independently of the step (b).

* * * * *